United States Patent [19]

Tieszen et al.

[11] Patent Number: 4,703,088

[45] Date of Patent: * Oct. 27, 1987

[54] MOLD CORROSION INHIBITORS

[75] Inventors: Dale O. Tieszen; James S. Dix, both of Bartlesville, Okla.

[73] Assignee: Phillips Petroleum Company, Bartlesville, Okla.

[*] Notice: The portion of the term of this patent subsequent to Jul. 9, 2002 has been disclaimed.

[21] Appl. No.: 332,282

[22] Filed: Dec. 18, 1981

[51] Int. Cl.$^4$ .............................................. C08L 81/00
[52] U.S. Cl. ................................... 525/189; 525/420; 106/14.13; 106/14.15
[58] Field of Search ............................... 525/189, 420; 106/14.13, 14.15

[56] References Cited

U.S. PATENT DOCUMENTS 3,379,792  4/1968  Finholt ................................. 260/857
3,776,880  12/1973 Blackwell ......................... 260/37 R
3,856,560  12/1974 Blackwell ....................... 117/132 B
4,017,555  4/1977  Alvarez ......................... 260/857 PA
4,064,084  12/1977 Blackwell ....................... 260/29.2 R
4,115,344  9/1978  Brady ..................................... 260/79
4,292,416  9/1981  Shue et al. ........................... 525/420
4,528,335  7/1985  Selby et al. .......................... 525/420

FOREIGN PATENT DOCUMENTS 0070010  1/1983  European Pat. Off. .
53-69255  6/1978  Japan .
1068952  5/1967  United Kingdom .

OTHER PUBLICATIONS

Abstract: Patent Abstracts of Japan, vol. 2, No. 105, Aug. 30, 1978, p. 1952, C78, J.P.A., 53-69255.

Primary Examiner—Melvyn I. Marquis
Attorney, Agent, or Firm—Lyell H. Carver

[57] ABSTRACT

Polyamide and polyacrylamide are useful as mold corrosion inhibitors when incorporated into a poly(arylene sulfide).

19 Claims, No Drawings

MOLD CORROSION INHIBITORS

This invention relates to a method for inhibiting the corrosion of metals by poly(arylene sulfide) resin compositions. This invention also relates to a composition comprising poly(arylene sulfide) and a polyacrylamide or polyamide corrosion inhibitor.

A problem associated with the molding of poly(arylene sulfide) resins is the occasional tendency of these resins to cause corrosion of the molds employed in the molding processes. For example, it has been occasionally noted that molds have become corroded during the injection molding of poly(arylene sulfide) resins. The corrosion, when observed, has varied from only a slight attack of the mold after a long molding period to very extensive damage after molding for only a short time. Accordingly, a means for mitigating this corrosion problem represents a substantial and very practical contribution of the art.

It has been found that the addition of a small amount of a polyacrylamide or polyamide to a poly(arylene sulfide) resin counteracts the tendency of such a resin to cause the corrosion of metal.

An object of this invention is to provide a method for inhibiting the corrosion of metals that come in contact with poly(arylene sulfide) resins, especially during the molding of such resins.

A further object is to provide a novel poly(arylene sulfide) resin composition that will not cause the corrosion of metals brought in contact with the composition.

Other objects, advantages and features of this invention will be apparent to those skilled in the art upon reading this disclosure and the appended claims.

In accordance with the practice of this invention, polyacrylamide or polyamide or a mixture thereof is incorporated into poly(arylene sulfide), i.e., sulfide polymer to inhibit or prevent corrosion of metals that come into contact with the composition.

Any normally solid poly(arylene sulfide) resin, whether linear, branched or lightly crosslinked, may be employed. The following patents, which are incorporated herein by reference, disclose the preparation of suitable poly(arylene sulfide) resins:

1. U.S. Pat. No. 2,513,188 (polyhalo aromatic compounds reacted with sulfur and metal sulfide at the fusion temperature).
2. British Pat. No. 962,941 (metal salts of halothiophenols are heated at a polymerizing temperature).
3. U.S. Pat. No. 3,354,129 (solution reaction of polyhalo compounds with alkali metal sulfides).
4. U.S. Pat. No. 3,717,620 (resins of U.S. Pat. No. 3,354,129 modified to yield resins of lower melt flow).
5. U.S. Pat. No. 3,919,177 (p-phenylene sulfide polymers produced by reacting p-dihalobenzene, a sulfur source, an alkali metal carboxylate and an organic amide).

Since the preparation of poly(arylene sulfide) resins is well known to those skilled in the art further description will not be set forth herein. For more detail one can refer to the above patents.

Molding grade poly(arylene sulfide) resins are particularly benefitted by the present invention. Generally such poly(arylene sulfide) resins have melting points in the range of about 260° C. to about 400° C. The melt flow of such poly(arylene sulfide) resins, determined by the method of ASTM D 1238-70, modified to a temperature of 316° C. using a 5-kg weight, will generally be within the range of about 0.5 to about 4,000 g/10 min. and preferably within about 10 to about 1000 g/10 min.

The presently preferred poly(arylene sulfide) resin is a linear, branched or lightly crosslinked poly(phenylene sulfide) resin. Molding grade poly(phenylene sulfide) resins can be molded into a variety of useful articles. The molding techniques are well known in the art. Generally molding is carried out above the melting point or softening point but below the decomposition point of the particular polymer being molded. Suitable molding techniques include injection molding, compression molding, vacuum molding, extrusion and the like.

While the present invention is especially suited to inhibit corrosion associated with the injection molding of poly(phenylene sulfide) resins, the scope of this invention encompasses any molding or extrusion technique wherein corrosion occurs as a result of the contacting of metal with any poly(arylene sulfide) resin.

The polyamides contemplated to be useful in the practice of this invention include polyamides defined by one of the following generic formulas:

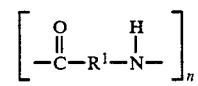

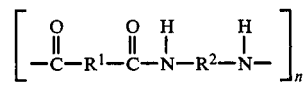

Each $R^1$ and $R^2$ independently represents an aliphatic hydrocarbon radical having from about 2 to about 15 carbon atoms, a cycloaliphatic hydrocarbon radical having from about 3 to about 16 carbon atoms, a mixed aliphatic-cycloaliphatic hydrocarbon radical having from about 6 to about 20 carbon atoms, or an aromatic hydrocarbon radical having from about 6 to about 20 carbon atoms. Each n is a whole number and, preferably, falls within the range of about 10 to about 500,000.

Examples of polyamides suitable as corrosion inhibitors in poly(arylene sulfide), particularly poly(phenylene sulfide), include those listed in the Encyclopedia of Polymer Science and Technology, Vol. 10, pages 392–411 (1969), incorporated by reference herein, such as polypyrrolidone or nylon-4, poly($\epsilon$-caprolactam) or nylon-6, poly(hexamethylene adipamide) or nylon-6,6, poly(enanthiamide) or nylon-9, poly(aminodecanoic acid) or nylon-10, poly($\omega$-undecanamide) or nylon-11, poly(laurolactam) or nylon-12, poly(hexamethylene dodecanamide) or nylon-6,10, poly(hexamethylene terephthalamide) or nylon-6,T. Also suitable are aramides such as poly(p-phenylene terephthalamide), poly(m-phenylene isophthalamide) and poly(N,N-di-phenyl-p-phenylene isophthalamides) and polyamides derived from bis(p-aminocyclohexyl) methane (PACM) and a dicarboxylic acid such as dodecanedioic acid. The presently preferred polyamide corrosion inhibitors are nylon-6,6, nylon-6 and nylon-12.

The polyacrylamides include polyacrylamides defined by the following generic formula:

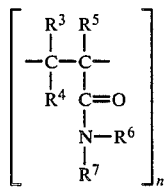

Each $R^3$, $R^4$ and $R^5$ indepedently represents hydrogen, an aliphatic hydrocarbon radical having from 1 to about 6 carbon atoms, or a cycloaliphatic hydrocarbon radical having from 3 to about 10 carbon atoms. Each $R^6$ and $R^7$ independently represents hydrogen, an aliphatic hydrocarbon radical having from about 1 to about 12 carbon atoms, a cycloaliphatic hydrocarbon radical having from about 3 to about 14 carbon atoms, an aromatic hydrocarbon radical having from about 6 to about 20 carbon atoms, or an alkylol radical having from about 3 to about 10 carbon atoms. The n represents a whole number, preferably within the range of about 10 to about 500,000.

Examples of polyacrylamides suitable as corrosion inhibitors in poly(phenylene sulfide) and other arylene sulfide polymers include those polymers described in the Encyclopedia of Polymer Science and Technology, Volume 1, pages 177–196 (1964), incorporated by reference herein, such as polyacrylamide, polymethacrylamide, poly(N-isopropylacrylamide), poly (N-tert-butylacrylamide), poly(N-methylolacrylamide) and poly (N,N-methylene bisacrylamide). Also suitable are ionic derivatives of these polyacrylamides such as (a) anionic derivatives prepared by partial hydrolysis, sulfomethylation or Hofman degradation of polyacrylamides or by copolymerization of acrylamides with acrylic acid, methacrylic acid, or sodium vinyl sulfonate and (b) cationic derivatives prepared by incorporating vinylpyridine, vinylbenzylammonium compounds or diallylammonium salts as comonomers in any of the above-described polyacrylamides.

The presently preferred polyacrylamide corrosion inhibitor is an anionic polyacrylamide marketed by Betz Corporation under the designation of Betz 100 PAA containing about 2–15 mole percent of hydrolyzed sodium acrylate comonomer. Anothez suitable, yet less preferred polyacrylamide is PAA WC 160 lalso marketed by Betz Corporation) a cationic polyacrylamide containing less than 10 mole percent of a quaternary ammonium compound as a comonomer.

Any of the above polyamide or polyacrylamide corrosion inhibitors or any combination thereof can be utilized in the practice of this invention.

Generally the weight ratio of polyamide or polyacrylamide or mixture thereof to the poly(arylene sulfide) resin is within the range of about 0.2:100 to about 3.0:100 and most preferably in the range of about 0.7:100 to about 1.0:100. However, it should be noted that the scope of this invention is not limited to sny specific range but rather requires only that a finite amount of polyamide or polyacrylamide or mixture thereof, sufficient to at least partially inhibit metal-corrosion, be incorporated into the poly(arylene sulfide) resin.

Incorporation of the corrosion inhibitor into the poly(arylene sulfide) resin may be accomplished, for example, by any known dry-blending means.

The poly(arylene sulfide) resins of this invention can also include other additives such as fillers, pigments, stabilizers, softeners, extenders and other polymers. In injection molding, for example, it is quite common to prepare poly(arylene sulfide) resin compositions containing about 20 to about 50 weight percent of a conventional glass fiber filler, based on the weight of the poly(arylene sulfide) resin and the glass fiber filler. Generally glass fibers of about 0.03 to about 0.5 inches in length are employed. However, glass-filled compositions prepared by feeding a continuous glass roving through an extruder along with the thermoplastic are also suitable.

The following examples are presented to further illustrate the practice of my invention. It will be apparent to those skilled in the art that modifications in the procedures described in these examples can be made without departing from the scope and spirit of my invention.

EXAMPLE I

In this example the procedure for preparing and testing certain poly(phenylene sulfide) compositions having good corrosion inhibiting properites is described. $5.0 \pm 0.05$ grams of FS-4 Ryton (Trademark) poly(phenylene sulfide ) (PPS), having a melt flow of about $180 \pm 40$ g/10 min. (determined according to ASTM D 1238 modified by using an effective weight of 5.0 Kg at 316 degrees C.), was mixed in an aluminum pan with about 0.02 to 0.05 grams of a polyamide or polyacrylamide corrosion inhibitor. The mixture was ground and more thoroughly mixed with mortar and pestle, and was then poured over an acetone-washed, mild $1'' \times 1'''$ steel coupon placed in an aluminum pan. The pan and its contents were heated for 3 hours at a temperature ranging from 680 degrees F. to 710 degrees F. The solid mixture was removed from the pan, and the steel coupon was exposed to moisture saturated air for two hours, and thereafter to ambient air for at least 16 hours. Rust formation was visually rated on a "good-fair-poor" scale.

EXAMPLE II

In this example, the corrosion inhibiting utility of nylon-6,6 in poly(phenylene sulfide) is illustrated. The nylon-6,6 used was a Monsanto multifil having a melting point of about 480 degrees F. to 500 degrees F., a specific gravity of 1.14 and a tenacity of 5.0 to 5.5 grams per denier.

The results are summarized in Table I.

TABLE I

| Run | Additive | Weight % of Additive | Corrosion Rating |
|---|---|---|---|
| 1 (Control) | None | 0 | Poor |
| 2 (Control) | $Li_2CO_3$ | 1.0 | Good |
| 3 (Invention) | Nylon-6,6 | 1.0 | Good |
| 4 (Invention) | Nylon-6,6 | 0.7 | Good |
| 5 (Invention) | Nylon-6,6 | 0.4 | Fair |

The data in Table 1 show that nylon-6,6 at levels of 0.7–1.0 weight percent is as effective as $Li_2CO_3$, which is commonly used as a mold corrosion inhibitor in poly(phenylene sulfide) molding compounds.

EXAMPLE III

The data in Table II illustrate the corrosion inhibiting effect of polyacrylamides when incorporated into poly(phenylene sulfide).

TABLE II

| Run | Additive | Weight % of Additive | Corrosion Rating |
|---|---|---|---|
| 1 (Control) | None | 0 | Poor |
| 6 (Invention) | Non-ionic PAA[a] | 1.0 | Fair to Poor |
| 7 (Invention) | PAA-WC 160[b] | 1.0 | Fair |
| 8 (Invention) | Betz 100[c] | 1.0 | Good |
| 9 (Invention) | Betz 100[c] | 0.7 | Fair |
| 10 (Invention) | Betz 100[c] | 0.4 | Fair |

[a] a polyacrylamide marketed by Pfaltz and Bauer
[b] a cationic polyacrylamide in which less than 10 percent of a quaternary aminoalkylacrylate ester is incorporated as a comonomer; marketed by Betz Corp., Trevose, Pa.
[c] an anionic polyacrylamide in which from 2 to 15 mole percent of a hydrolyzed sodium acrylate is incorpoated as a comonomer; molecular weight: 2-10 × $10^6$; marketed by Betz Corporation, Tervose, Pa.

The data in Table II show that within the experimental parameters ionic polyacrylamides are more effective in reducing poly(phenylene sulfide)-caused corrosion than non-ionic polyacrylamides. An anionic polyacrylamide containing from 2 to 15 mole percent of hydrolyzed sodium acrylate as monomer was essentially as effective as nylon-6,6 (see Table I) when added as a mold corrosion inhibitor to poly(phenylene sulfide) at levels of from 0.4 to 1.0 weight percent.

EXAMPLE IV

In this example, the corrosion inhibiting effects of equal amounts of three polyamides in poly(phenylene sulfide) are compared. The polyamides employed were a ground general purpose nylon-6,6 resin (marketed as 10 V by Monsanto), a nylon-6 (marketed by Rhodiaceta) and a nylon-12 (marketed by Rhodiaceta). Each of the inventive Poly(phenylene sulfide) compositions contained 1.0 weight percent of one of the polyamides. The two control runs were repeated.

TABLE III

| Run | Additive | Weight % of Additive | Corrosion Rating |
|---|---|---|---|
| 1 (control) | None | — | Poor |
| 2 (control) | $Li_2CO_3$ | 1.0 | Good |
| 3 (invention) | Nylon-6,6 | 1.0 | Good |
| 4 (invention) | Nylon-6 | 1.0 | Good |
| 5 (invention) | Nylon-12 | 1.0 | Good |

The results of runs 1, 2 and 3 were the same as before in Example II, thus confirming the earlier results. The results of runs 4 and 5 show that other polyamides are also effective corrosion inhibitors in poly(phenylene sulfide).

It was the purpose of this disclosure to give a full and complete description of our invention and to set forth the best mode of operation. Reasonable modifications of and variations from this disclosure and the appended claims are, however, contemplated to be within the scope of patent protection desired and sought.

We claim:

1. A composition comprising poly(arylene suliide) and a corrosion inhibitor selected from the group consisting of polyamide, polyacrylamide, ionic derivatives of said polyacrylamide, and mixtures thereof; wherein the weight ratio of corrosion inhibitor to poly(arylene sulfide) is within the range of about 0.7:100 to about 1:100.

2. A composition in accordance with claim 1 wherein said poly(arylene sulfide) is poly(phenylene sulfide).

3. A composition in accordance with claim 3 wherein said corrosion inhibitor is a polyamide.

4. A composition in accordance with claim 3 wherein said polyamide is defined by a formula selected from the group consisting of

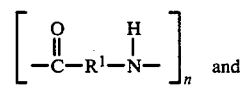 and

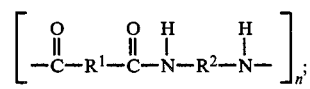

wherein each $R^1$ and $R^2$ is independently selected from the group consisting of aliphatic hydrocarbon radicals having from about 2 to about carbon atoms, cycloaliphatic hydrocarbon radicals having from about 3 to about 16 carbon atoms, mixed aliphatic-cycloaliphatic hydrocarbon radicals having from about 6 to about 20 carbon atoms and aromatic hydrocarbon radicals having from about 6 to about 20 carbon atoms; and wherein n is a whole number ranging from about 10 to about 500,000.

5. A composition in accordance with claim 3 wherein said poly(arylene sulfide) is poly(phenylene sulfide).

6. A composition in accordance with claim 5 wherein said polyamide is poly(hexamethylene adipamide).

7. A composition in accordance with claim 5 wherein said polyamide is poly(ε-caprolactam).

8. A composition in accordance with claim 5 wherein said polyamide is poly(aminodecanoic acid).

9. A composition in accordance with claim 5 wherein said polyamide is poly(laurolactam).

10. A composition comprising poly(arylene sulfide) and a corrosion inhibitor selected from the group consisting of polyacrylamide, ionic derivatives of said polyacrylamide, and mixtures of the above; wherein the weight ratio of corrosion inhibitor to poly(arylene sulfide) is within the range of about 0.2:100 to abot 3.0:100.

11. A composition in accordance with claim 10 wherein said polyacrylamide is defined by the formula

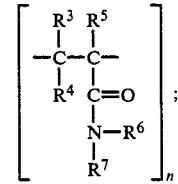

wherein $R^3$, $R^4$, and $R^5$, are independently selected from the group consisting of hydrogen, aliphatic hydrocarbon radicals having from about to about 6 carbon atoms and cycloaliphatic hydrocarbon radicals having from about 3 to about 10 carbon atoms; wherein $R^6$ and $R^7$ are independently selected from the group consisting of hydrogen, aliphatic hydrocarbon radicals having from about 1 to about 12 carbon atoms, cycloaliphatic hydrocarbon radicals having from about 3 to about 15 carbon atoms, aromatic hydrocarbon radicals having from about 6 to about carbon atoms and alkylol radicals having from about 3 to about 10 carbon atoms; and whezein n is a whole number ranging from about 10 to about 500,000.

12. A composition in accordance with claim 11 wherein said corrosion inhibitor is a polyacrylamide.

13. A composition in accordance with claim 11 wherein said corrosion inhibitor is an anionic derivative of said polyacrylamide.

14. A composition in accordance with claim 11 wherein said corrosion inhibitor is a cationic derivative of said polyacrylamide.

15. A composition in accordance with claim 11 wherein said poly(arylene suliide) is poly(phenylene sulfide).

16. A method for inhibiting corrosion which comprises combining poly(arylene sulfide) and a corrosion inhibitor selected from the group consisting of polyamide, polyacrylamide, ionic derivatives of said polyacrylamide, and mixtures of the above; wherein the weight ratio of corrosion inhibitor to poly(arylene sulfide) is within the range of about 0.7:100 to about 1:100.

17. A method according to claim 16 wherein said corrosion inhibitor is polyamide.

18. A method according to claim 17 wherein said poly(arylene sulfide) is poly(phenylene sulfide).

19. A method for inhibiting corrosion which comprises combining poly(arylene sulfide) and a corrosion inhibitor selected from the group consisting of polyacrylamide, ionic derivatives of said polyacrylamide, and mixtures of the above; wherein the weight ratio of corrosion inhibitor to poly(arylene sulfide) is within the range of about 0.2:100 to about 3:100.

* * * * *

UNITED STATES PATENT AND TRADEMARK OFFICE
CERTIFICATE OF CORRECTION

PATENT NO. : 4,703,088
DATED : October 27, 1987
INVENTOR(S) : Dale O. Tieszen and James S. Dix It is certified that error appears in the above-identified patent and that said Letters Patent are hereby corrected as shown below:

Claim 3, column 6, line 13, delete (3) and insert --- 1 ---.

Claim 10, column 6, line 53, delete (abot) and insert --- about ---.

Claim 11, column 7, line 8, delete (irom) and insert --- from ---,
line 8, after "about" and before "carbon" insert
--- 20 ---,
line 10, delete (whezein) and insert --- wherein ---.

Claim 15, column 8, line 2, delete (suliide) and insert --- sulfide ---.

Signed and Sealed this

Fifth Day of April, 1988

Attest:

DONALD J. QUIGG

Attesting Officer    Commissioner of Patents and Trademarks